(No Model.)
P. H. STEVENS.
WATCHMAKER'S LOUPE.
No. 575,075. Patented Jan. 12, 1897.
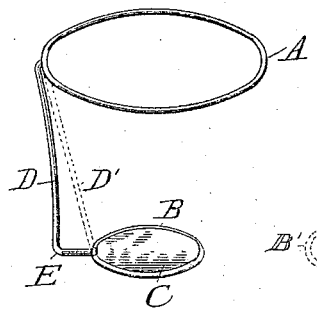
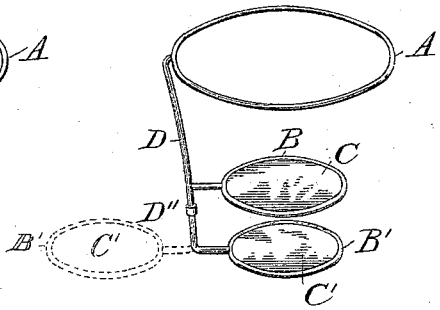
Witnesses.
Alex. Scott
R. A. Balderson
Inventor.
Philip H. Stevens,
By Newell & Jennings
His Attys

UNITED STATES PATENT OFFICE.

PHILIP H. STEVENS, OF BRISTOL, CONNECTICUT.

WATCHMAKER'S LOUPE.

SPECIFICATION forming part of Letters Patent No. 575,075, dated January 12, 1897.

Application filed April 30, 1896. Serial No. 589,801. (No model.)

*To all whom it may concern:*

Be it known that I, PHILIP H. STEVENS, a citizen of the United States, residing in Bristol, in the county of Hartford and State of Connecticut, have invented a certain new and useful Improvement in Watchmakers' Loupes; and I do declare the following, when taken in connection with the accompanying drawings and the letters of reference marked thereon, to be a full, clear, and exact description of the same, said drawings forming a part of this specification.

My invention relates to watchmakers' loupes which are used by watchmakers, watch-repairers, jewelers, and others who require a magnifying-glass which can be held in place in front of the eye by contraction of the adjacent muscles, leaving the hands free and permitting the user to move his head at will. Heretofore this loupe has usually consisted of a rubber tube or cylinder provided at one end with a lens and open at the other. It was formerly erroneously supposed necessary to prevent the light penetrating back of the lens and between the lens and the eye. The construction referred to provided, therefore, an opaque cylinder. A large proportion of the users of this instrument are obliged to wear eyeglasses or spectacles, and when it becomes necessary to employ the loupe the spectacles or ordinary eyeglasses must be removed. The rubber cylinder also necessarily must have material weight, and no variation of magnifying power is secured except through the use of different loupes having lenses varying in power. For the purpose of avoiding these difficulties and to gain sundry other great advantages and to save cost in manufacture my invention consists of a loupe of the class described, consisting simply of circular wires or frames of different diameters connected rigidly by a third wire, the larger of which is adapted to be held by the muscles about the eye and the smaller to constitute frames for magnifying-lenses.

In the accompanying drawings, Figure 1 shows an ordinary single-lens eyeglass; Fig. 2, one with two lenses.

A is a rim of wire of diameter suitable for being held firmly by the muscles adjacent to the eye, and which I will call the "holding-rim."

B is a slight circular frame for inclosing and securing the lens C, which may be of the form and kind required.

D is the connecting-wire, rigidly connecting the lens-frame and holding-rim a uniform distance apart and in substantially parallel planes. This connecting-wire is best curved or bent at E in order that the wire may be kept well out of the line of vision and the lens brought into the line of vision. This may be constructed as shown by dotted line D, and must be adjusted to suit the particular case.

If desired, a second lens may be provided, held by a second wire frame, as B', by a continuation of the connecting-wire, as D''. This may be provided with a swivel-joint, as at F, or may be otherwise constructed so as to permit the second lens B' to be swung out of the line of vision. In this way lenses of different magnifying powers adapted to different purposes are supplied in the same loupe. In practice the holding-rim is held by the contraction of the muscles about the eye and can be used by those wearing ordinary eyeglasses or spectacles by slipping the holding-rim into place behind the eyeglasses or spectacles, the connecting-wire extending around outside of the periphery of the ordinary eyeglass.

It is evident that there may be changes in the form of the rims and connecting-wires and of the lenses, and there may be an indefinite number of lenses employed. I would have it understood, therefore, that I do not limit myself to the exact construction herein shown and described, but hold myself at liberty to make such changes and alterations as fairly fall within the spirit and scope of my invention.

Having fully described my invention, what I claim as new, and desire to secure by Letters Patent, is—

1. The watchmaker's loupe, consisting of a rim adapted to be held by the contraction of the muscles about the eye, a frame or frames containing lenses of suitable magnifying power, and a wire substantially at right angles to the planes of said rim and frames connecting them rigidly, and so constructed as that the glass may be used by an operator wearing eyeglasses without removing the same, substantially as and for the purpose specified.

2. A watchmaker's loupe consisting of a holding-rim, a frame provided with a lens, and a rigid connecting-wire curved or bent so that when the glass is in use the connecting-wire will be out of the line of vision, substantially as set forth.

3. A watchmaker's loupe consisting of a holding-rim and frames provided with lenses connected rigidly by a wire so that the holding-rim and lenses are in substantially parallel planes, substantially as set forth.

4. A watchmaker's loupe consisting of a holding-rim and frames provided with lenses in planes substantially parallel to that of the holding-rim connected with said holding-rim by a wire which is provided with swivel-joints so that the lens-frames may be swung out of the line of vision, in order that the use of lenses of different powers may be provided in the same loupe, substantially as described.

5. In a watchmaker's loupe the combination of an eyepiece, a lens, and a swiveled connection whereby the lens may be turned out of the line of vision.

6. In a watchmaker's loupe the combination of a holding-piece, a lens, and lens-supporting connecting means attached to one side only of the holding-piece.

7. In a watchmaker's loupe the combination of a holding-piece, a projection from one side only of said piece, and a lens-support adjustably connected to said projection, whereby the lens may be turned out of the line of vision.

In testimony whereof I have signed my name to this specification, in the presence of two subscribing witnesses, this 20th day of April, A. D. 1896.

PHILIP H. STEVENS.

Witnesses:
   ALICE E. BROWN,
   JUNIUS Z. DOUGLASS.